United States Patent [19]
Connor

[11] Patent Number: 5,984,250
[45] Date of Patent: Nov. 16, 1999

[54] LATCH HOOK

[76] Inventor: Vincent Connor, 6816 Clover La., Upper Darby, Pa. 19082

[21] Appl. No.: 09/121,340

[22] Filed: Jul. 23, 1998

[51] Int. Cl.[6] .................................................. F16B 45/00
[52] U.S. Cl. .................. 248/304; 248/294.1; 294/82.19; 24/599.1
[58] Field of Search ........................... 248/301, 305, 248/306, 307, 310, 339, 304, 294.1, 225.21, 227.1, 322, 214, 215, 211, 213, 240; 294/82.19, 82.31, 82.2; 24/599.4, 599.1, 599.6

[56] References Cited

U.S. PATENT DOCUMENTS

| | | | |
|---|---|---|---|
| 283,464 | 8/1883 | Brown | 294/82.19 |
| 482,885 | 9/1892 | Wallace | 24/599.1 |
| 978,734 | 12/1910 | Gordon | 248/304 |
| 997,630 | 7/1911 | Lozenski | 213/209 |
| 1,596,948 | 8/1926 | Saunders | 294/82.19 |
| 1,711,440 | 4/1929 | Baker | 277/350 |
| 1,747,128 | 2/1930 | O'Bannon | 294/82.2 |
| 2,349,021 | 5/1944 | Truesdale et al. | 294/82.19 |
| 2,492,991 | 1/1950 | Hanna | 24/599.6 |
| 2,787,435 | 4/1957 | Shields | 248/307 |
| 2,872,717 | 2/1959 | Kelley | 294/82.19 |
| 3,008,210 | 11/1961 | Stovern | 294/82.19 |
| 3,317,972 | 5/1967 | Harley | 24/599.4 |
| 3,922,028 | 11/1975 | Svensson et al. | 294/82 R |
| 3,949,951 | 4/1976 | Bunn | 24/241 |
| 4,062,092 | 12/1977 | Tamada et al. | 24/241 |
| 5,538,303 | 7/1996 | Dunham | 294/82.31 |
| 5,664,304 | 9/1997 | Tambornino | 24/599.1 |
| 5,727,834 | 3/1998 | Weselowski | 294/82.19 |
| 5,820,181 | 10/1998 | Le Noach | 294/19.1 |

*Primary Examiner*—Ramon O. Ramirez
*Assistant Examiner*—Tan Le

[57] ABSTRACT

A new latch hook for permitting secure hanging of strapped bags, such as purses and backpacks, to help prevent easy removal by thieves. The inventive device includes a mounting plate, a hook body, and a latch member. The root of the hook body is coupled to the mounting plate while the tip of the hook body is spaced apart from the mounting plate. The hook body also has a lower arcuate portion positioned adjacent the tip of the hook body. An arcuate inner hooked portion positioned adjacent the lower arcuate portion of the hook body is extended from the hook body towards the mounting plate. The upper end of the latch member is pivotally coupled to the hook body between the root of the hook body and the inner hooked portion such that the latch member extends toward the tip of the hook body.

9 Claims, 2 Drawing Sheets

LATCH HOOK

BACKGROUND OF THE INVENTION

1. Field of the Invention

The present invention relates to garment hooks and more particularly pertains to a new latch hook for permitting secure hanging of strapped bags, such as purses and backpacks, to help prevent easy removal by thieves.

2. Description of the Prior Art

The use of garment hooks is known in the prior art. More specifically, garment hooks heretofore devised and utilized are known to consist basically of familiar, expected and obvious structural configurations, notwithstanding the myriad of designs encompassed by the crowded prior art which have been developed for the fulfillment of countless objectives and requirements.

Known prior art garment hooks include U.S. Pat. No. 5,664,304; U.S. Pat. No. 3,317,972; U.S. Pat. No. 4,062,092; U.S. Pat. No. 3,949,451; U.S. Pat. No. Des. 229,870; and U.S. Pat. No. 5,094,417.

While these devices fulfill their respective, particular objectives and requirements, the aforementioned patents do not disclose a new latch hook. The inventive device includes a mounting plate, a hook body, and a latch member. The root of the hook body is coupled to the mounting plate while the tip of the hook body is spaced apart from the mounting plate. The hook body also has a lower arcuate portion positioned adjacent the tip of the hook body. An arcuate inner hooked portion positioned adjacent the lower arcuate portion of the hook body is extended from the hook body towards the mounting plate. The upper end of the latch member is pivotally coupled to the hook body between the root of the hook body and the inner hooked portion such that the latch member extends toward the tip of the hook body.

In these respects, the latch hook according to the present invention substantially departs from the conventional concepts and designs of the prior art, and in so doing provides an apparatus primarily developed for the purpose of permitting secure hanging of strapped bags, such as purses and backpacks, to help prevent easy removal by thieves.

SUMMARY OF THE INVENTION

In view of the foregoing disadvantages inherent in the known types of garment hooks now present in the prior art, the present invention provides a new latch hook construction wherein the same can be utilized for permitting secure hanging of strapped bags, such as purses and backpacks, to help prevent easy removal by thieves.

The general purpose of the present invention, which will be described subsequently in greater detail, is to provide a new latch hook apparatus and method which has many of the advantages of the garment hooks mentioned heretofore and many novel features that result in a new latch hook which is not anticipated, rendered obvious, suggested, or even implied by any of the prior art garment hooks, either alone or in any combination thereof.

To attain this, the present invention generally comprises a mounting plate, a hook body, and a latch member. The root of the hook body is coupled to the mounting plate while the tip of the hook body is spaced apart from the mounting plate. The hook body also has a lower arcuate portion positioned adjacent the tip of the hook body. An arcuate inner hooked portion positioned adjacent the lower arcuate portion of the hook body is extended from the hook body towards the mounting plate. The upper end of the latch member is pivotally coupled to the hook body between the root of the hook body and the inner hooked portion such that the latch member extends toward the tip of the hook body.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new latch hook apparatus and method which has many of the advantages of the garment hooks mentioned heretofore and many novel features that result in a new latch hook which is not anticipated, rendered obvious, suggested, or even implied by any of the prior art garment hooks, either alone or in any combination thereof.

It is another object of the present invention to provide a new latch hook which may be easily and efficiently manufactured and marketed.

It is a further object of the present invention to provide a new latch hook which is of a durable and reliable construction.

An even further object of the present invention is to provide a new latch hook which is susceptible of a low cost of manufacture with regard to both materials and labor, and which accordingly is then susceptible of low prices of sale to the consuming public, thereby making such latch hook economically available to the buying public.

Still yet another object of the present invention is to provide a new latch hook which provides in the apparatuses and methods of the prior art some of the advantages thereof, while simultaneously overcoming some of the disadvantages normally associated therewith.

Still another object of the present invention is to provide a new latch hook for permitting secure hanging of strapped bags, such as purses and backpacks, to help prevent easy removal by thieves.

Yet another object of the present invention is to provide a new latch hook which includes a mounting plate, a hook body, and a latch member. The root of the hook body is coupled to the mounting plate while the tip of the hook body is spaced apart from the mounting plate. The hook body also has a lower arcuate portion positioned adjacent the tip of the hook body. An arcuate inner hooked portion positioned adjacent the lower arcuate portion of the hook body is extended from the hook body towards the mounting plate. The upper end of the latch member is pivotally coupled to the hook body between the root of the hook body and the inner hooked portion such that the latch member extends toward the tip of the hook body.

Still yet another object of the present invention is to provide a new latch hook that may be mounted to the doors of public restrooms to provide more security when hanging bags and other items on the hook.

Even still another object of the present invention is to provide a new latch hook that prevents quick bag snatches by thieves.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
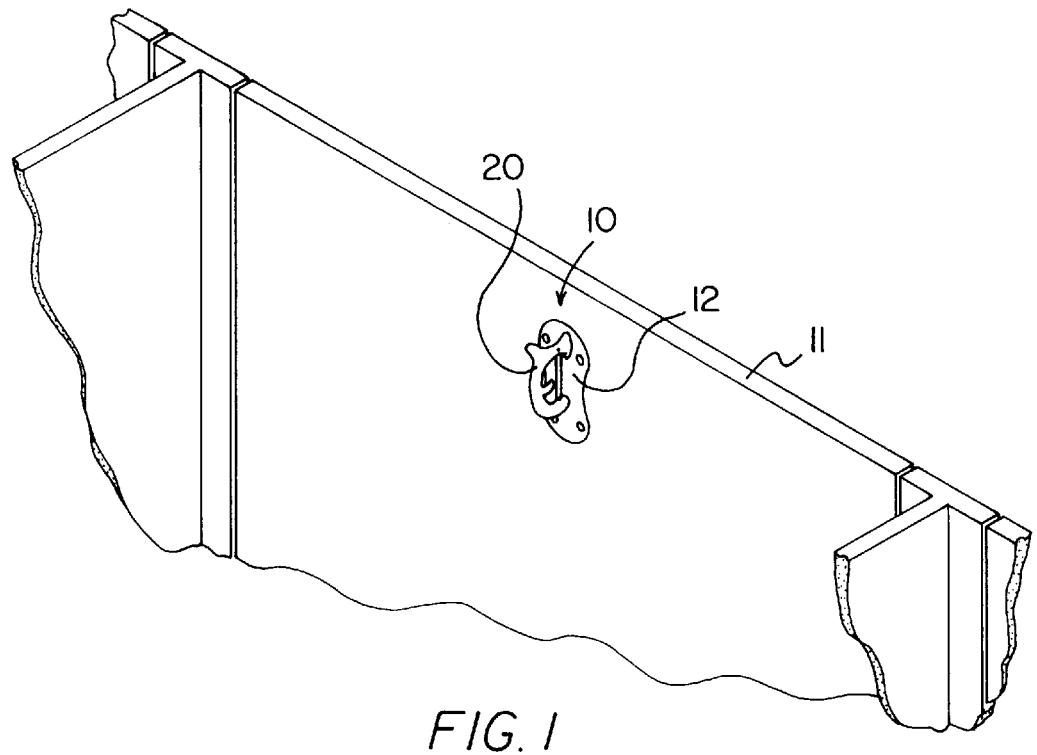
FIG. 1 is a schematic perspective view of a new latch hook mounted to a door of a stall according to the present invention.

With reference now to the drawings, and in particular to FIGS. 1 through 4 thereof, a new latch hook embodying the principles and concepts of the present invention and generally designated by the reference numeral 10 will be described.

In use, the latch hook 10 is designed for hanging items thereon and is mountable to a structure 11 such as a wall or, even more preferably, a door of a toilet stall in a public bathroom as illustrated in FIG. 1. As best illustrated in FIGS. 1 through 4, the latch hook 10 generally comprises a mounting plate 12, a hook body 20, and a latch member 25. The root 21 of the hook body 20 is coupled to the mounting plate 12 while the tip 22 of the hook body 20 is spaced apart from the mounting plate 12. The hook body 20 also has a lower arcuate portion 23 positioned adjacent the tip 22 of the hook body 20. An arcuate inner hooked portion 24 positioned adjacent the lower arcuate portion 23 of the hook body 20 is extended from the hook body 20 towards the mounting plate 12. The upper end 26 of the latch member 25 is pivotally coupled to the hook body 20 between the root 21 of the hook body 20 and the inner hooked portion 24 such that the latch member 25 extends toward the tip 22 of the hook body 20.

In closer detail, the mounting plate 12 is generally figure eight-shaped and has upper and lower ends 13,14, a pair of lobes, and a central axis extending between the ends of the mounting plate 12. The mounting plate 12 is designed for mounting to a vertical structure 11 such as a wall or the door of a toilet stall in that public bathroom. Preferably, the mounting plate 12 has a plurality of mounting holes 15 therethrough. The mounting holes 15 are designed for extending threaded fasteners therethrough to mount the mounting plate 12 to the structure 11. Ideally, the plurality of mounting holes 15 comprises four mounting holes with a first pair of mounting holes located on one of the lobes of the mounting plate and a second pair of mounting holes located on the other lobe of the mounting plate. In this ideal embodiment, preferably, the central axis is centrally positioned between each pair of mounting holes.

Figure 4:
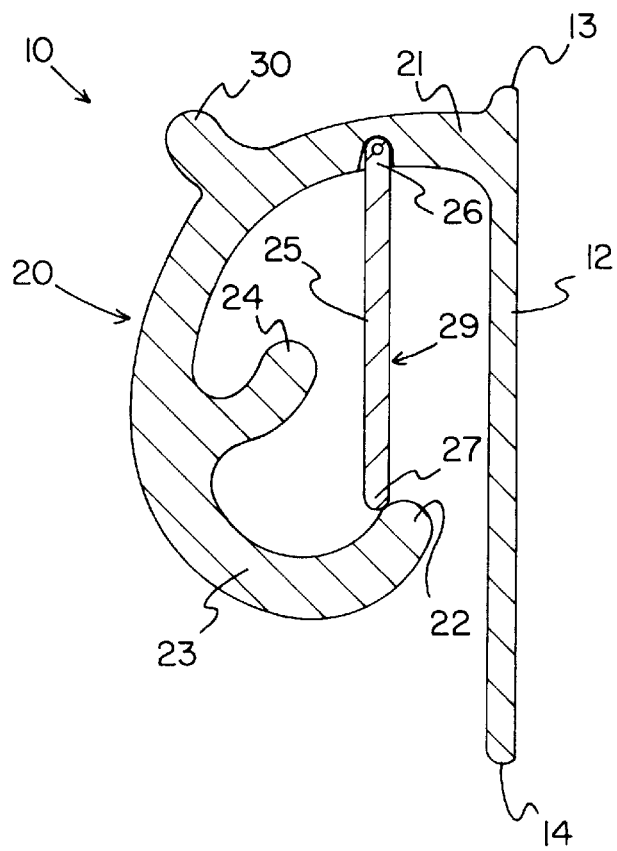
FIG. 4 is a schematic cross-sectional view of the present invention.

As best illustrated in FIGS. 1 and 4, the arcuate hook body 20 is generally C-shaped and has a root 21 and a tip 22. The root 21 of the hook body 20 is coupled to the mounting plate 12 and is preferably positioned towards the upper end 13 of the mounting plate 12. The hook body 20 has a lower arcuate portion 23 positioned adjacent the tip 22 of the hook body 20. The lower arcuate portion 23 of the hook body 20 curves the tip 22 of the hook body 20 towards the root 21 of the hook body 20. The tip 22 of the hook body 20 is spaced apart from the mounting plate 12 to form a gap between the tip 22 of hook body 20 and the mounting plate 12 to permit passing of a portion of the strap of an item such as a bag therethrough when hanging or removing the strap of the item on the hook body 20.

The arcuate inner hooked portion 24 is extended from the hook body 20 towards the mounting plate 12. The inner hooked portion 24 is positioned adjacent the lower arcuate portion 23 of the hook body 20 and curves towards the root 21 of the hook body 20. The inner hooked portion 24 is designed for resting items thereon passed through the gap between the tip 22 of the hook body 20 and the mounting plate 12.

Figure 2:
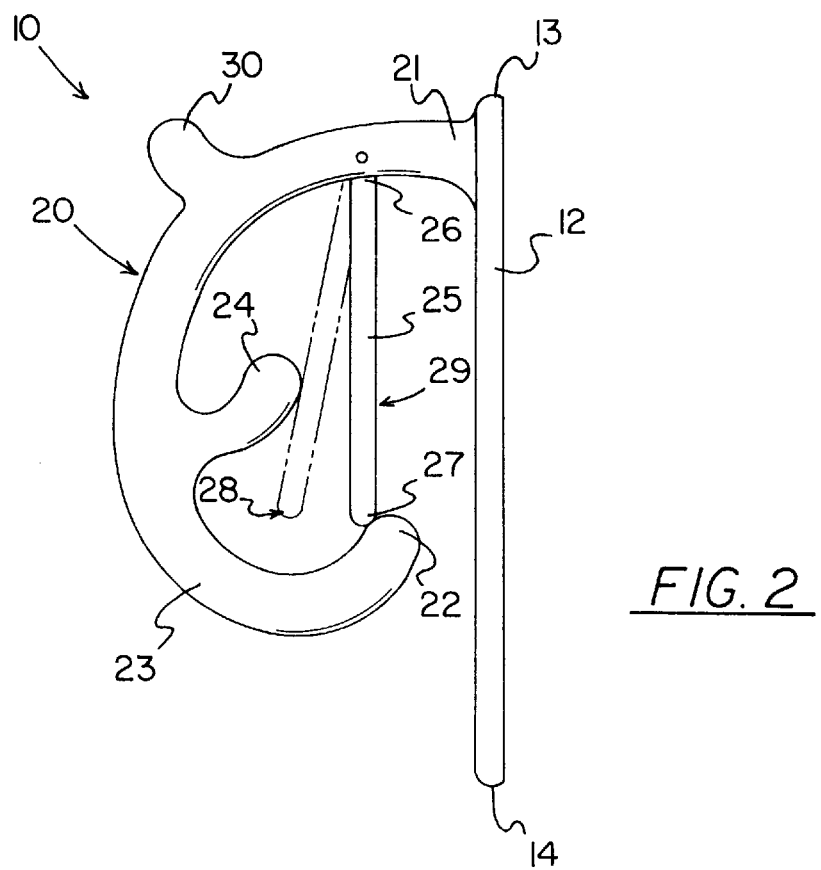
FIG. 2 is a schematic side view of the present invention.
Figure 3:
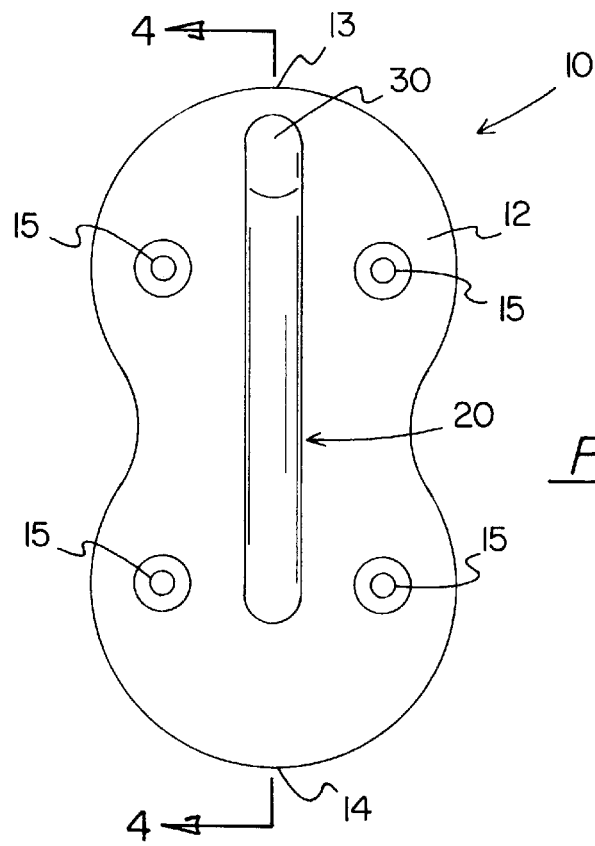
FIG. 3 is a schematic front view of the present invention.

The elongate latch member 25 has upper and lower ends 26,27. The upper end 26 of the latch member 25 is pivotally coupled to the hook body 20 by a pivot pin between the root 21 of the hook body 20 and the inner hooked portion 24 such that the latch member 25 downwardly extends toward the tip 22 of the hook body 20. The latch member 25 is designed for preventing a thief from quickly snatching an item such as a purse or tote bag hanging on the inner hooked portion 24. As illustrated in FIG. 2, in use, the latch member 25 is pivotable between open and closed positions 28, 29. When the latch member 25 is pivoted to the open position 28, the latch member 25 abuts the inner hooked portion 24 with the lower end 27 of the latch member 25 spaced apart from the tip 22 of the hook body 20. When the latch member 25 is pivoted to the closed position 29, the lower end 27 of the latch member 25 abuts the tip 22 of the hook body 20 such that the tip 22 is positioned between the lower end 27 of the latch member 25 and the mounting plate 12. Preferably, the latch member 25 is biased towards the closed position 29.

In use, when hanging an item on the latch hook, a user passes a portion of the carrying strap of the item through the gap between the tip 22 and the mounting plate 12. The user then pivots the latch member 25 from the closed position 29 towards the open position 28 by pushing the latch with a finger or the strap of the item itself. The strap is then positioned adjacent the lower arcuate portion 23 of the hook body 20 to let the latch member 25 pivot back to the closed position 29. The strap may then be hung on the inner hooked portion 24 so that a thief cannot easily snatch the hung item. These steps are reversed to remove the item from the latch hook.

Optionally, an arcuate outer hooked portion 30 may be extended from the hook body 20 away from the mounting plate 12 so that the outer hooked portion 30 curves upwards from the hook body 20. The outer hooked portion 30 is positioned between the upper end 26 of the latch member 25 and the inner hooked portion 24. The outer hooked portion 30 is designed for hanging additional items thereon that a user is not concerned about is quickly snatched away.

In an ideal illustrative embodiment, the mounting plate 12 has a length between the ends 13,14 of the mounting plate 12 of about 5 inches. In this embodiment, the tip 22 of the hook body 20 is spaced apart from the mounting plate 12 about 1 inch and the width which the latch hook extends outwards from a structure 11 it is mounted to is about 3 inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A latch hook for hanging items thereon, said latch hook being mountable to a structure, said latch hook comprising:
    a planar mounting plate being for mounting to a structure, said mounting plate having planar front and back faces;
    a hook body having a root and a tip;
    said root of said hook body being coupled to said mounting plate;
    said hook body lying in a plane outwardly extending from said front face of said mounting plate;
    said hook body having a lower arcuate portion, said lower arcuate portion of said hook body being positioned adjacent said tip of said hook body;
    said tip of said hook body being spaced apart from and facing said front face of said mounting plate to define a gap between said tip and said front face of said mounting plate;
    an arcuate inner hooked portion being extended from said hook body towards said mounting plate, said inner hooked portion being positioned adjacent said lower arcuate portion of said hook body, said inner hooked portion having a free terminal end extending towards and spaced apart from said front face of said mounting plate; and
    an elongate latch member having upper and lower ends, said upper end of said latch member being pivotally coupled to said hook body between said root of said hook body and said inner hooked portion such that said latch member extends toward said tip of said hook body.

2. The latch hook of claim 1, wherein said mounting plate has a plurality of mounting holes therethrough, said mounting holes being for extending fasteners therethrough to mount said mounting plate to the structure.

3. The latch hook of claim 2, wherein said mounting plate is generally eight-shaped and has a pair of lobes wherein said plurality of mounting holes comprises four mounting holes, a first pair of said mounting holes being located on one of said lobes of said mounting plate, a second pair of said mounting holes being located on the other of said lobes of said mounting plate.

4. The latch hook of claim 1, wherein said inner hook portion curves towards said root of said hook body and has an upwardly facing concavity.

5. The latch hook of claim 1, wherein said latch member is pivotable between open and closed positions, wherein said latch member abuts said inner hooked portion when said latch member is pivoted to said open position, and wherein said lower end of said latch member abuts said tip of said hook body when said latch member is pivoted to said closed position.

6. The latch hook of claim 5, wherein said latch member is biased towards said closed position.

7. The latch hook of claim 1, further comprising an arcuate outer hooked portion being extended from said hook body away from said mounting plate, said outer hooked portion curving upwards from said hook body, said outer hooked portion being positioned between said upper end of said latch member and said inner hooked portion, said outer hooked portion having a free upper end spaced apart from said hook body.

8. The latch hook of claim 1, wherein said lower arcuate portion of said hook body curves said tip of said hook body towards said root of said hook body, said hook body having a constant generally circular transverse cross section along said hook body between said root and tip of said hook body such that said hook body has open side faces, said hook body lying in a plane extending perpendicular to said front face of said mounting plate, said C-shaped inner and outer sides of said hook body lying in planes perpendicular to said front face of said mounting plate.

9. A latch hook for hanging items thereon, said latch hook being mountable to a structure, said latch hook comprising:
    a planar mounting plate being generally eight-shaped and having upper and lower ends, planar front and back faces, a pair of lobes, and a central axis extending between said ends of said mounting plate, said mounting plate being for mounting to a vertical structure such that said back face of said mounting plate abuts and is parallel to the vertical structure and said front face of said mounting plate faces outwardly away from the vertical structure;
    said mounting plate having a plurality of mounting holes therethrough, said mounting holes being for extending fasteners therethrough to mount said mounting plate to the structure;
    wherein said plurality of mounting holes comprises four mounting holes, a first pair of said mounting holes being located on one of said lobes of said mounting plate, a second pair of said mounting holes being located on the other of said lobes of said mounting plate;

said central axis being centrally positioned between each pair of mounting holes;

a hook body being generally C-shaped and having a root and a tip, and C-shaped inner and outer sides extending continuously between said root and tip of hook body;

said hook body having a constant generally circular transverse cross section along said hook body between said root and tip of said hook body such that said hook body has open side faces;

said hook body lying in a plane extending perpendicular to said front face of said mounting plate;

said C-shaped inner and outer sides of said hook body lying in planes perpendicular to said front face of said mounting plate;

said root of said hook body being coupled to said mounting plate, said root of said hook body being positioned towards said upper end of said mounting plate;

said hook body having a lower arcuate portion, said lower arcuate portion of said hook body being positioned adjacent said tip of said hook body, said lower arcuate portion of said hook body curving said tip of said hook body towards said root of said hook body;

said tip of said hook body being spaced apart from and facing said mounting plate to form a gap between said top of said hook body and said front face of said mounting plate to permit passage of a strap of a bag between said tip of said hook body and said front face of said mounting plate;

an arcuate inner hooked portion being extended from said C-shaped inner side of said hook body towards said mounting plate, said inner hooked portion being positioned adjacent said lower arcuate portion of said hook body, said inner hook portion curving towards said root of said hook body and having an upwardly facing concavity;

said inner hook portion having a free terminal end facing towards and spaced apart from said front face of said mounting plate;

an elongate latch member having upper and lower ends, said upper end of said latch member being pivotally coupled to said hook body between said root of said hook body and said inner hooked portion such that said latch member extends toward said tip of said hook body;

said latch member being pivotable between open and closed positions, wherein said latch member abuts said inner hooked portion when said latch member is pivoted to said open position, wherein said lower end of said latch member abuts said tip of said hook body when said latch member is pivoted to said closed position, wherein said latch member is biased towards said closed position;

an arcuate outer hooked portion being extended from said hook body away from said mounting plate, said outer hooked portion curving upwards from said hook body, said outer hooked portion being positioned between said upper end of said latch member and said inner hooked portion; and said outer hooked portion having a free upper end spaced apart from said hook body.

* * * * *